United States Patent [19]

Dorman

[11] 4,299,415

[45] Nov. 10, 1981

[54] SWIVEL FITTING AND METHOD FOR MAKING

[75] Inventor: Hugh H. Dorman, Marshall, Mich.

[73] Assignee: Patco, Marshall, Mich.

[21] Appl. No.: 971,999

[22] Filed: Dec. 21, 1978

[51] Int. Cl.³ .............................................. F16L 27/00
[52] U.S. Cl. ................................... 285/281; 285/286; 285/DIG. 17
[58] Field of Search ............... 285/281, 276, DIG. 17, 285/DIG. 24, 286, 321

[56] References Cited

U.S. PATENT DOCUMENTS

| | | | |
|---|---|---|---|
| 1,703,232 | 2/1929 | Gray et al. | 285/DIG. 17 X |
| 2,226,826 | 12/1940 | Miller | 285/321 X |
| 2,340,349 | 2/1944 | Somes | 285/DIG. 17 X |
| 2,724,368 | 11/1955 | Miller | 92/128 |
| 2,745,682 | 5/1956 | Chevallier | 285/276 X |
| 2,786,698 | 3/1957 | Bard | 285/276 |
| 3,314,694 | 4/1967 | Faccou | 285/276 X |
| 3,578,361 | 5/1971 | Corrigan | 285/276 X |
| 3,799,589 | 3/1974 | Boelkins | 285/281 |
| 4,099,706 | 7/1978 | Steele, Jr. et al. | 285/286 X |

FOREIGN PATENT DOCUMENTS

| | | | |
|---|---|---|---|
| 623983 | 2/1963 | Belgium | 285/281 |
| 1054295 | 4/1959 | Fed. Rep. of Germany | 285/281 |
| 417249 | 1/1967 | Switzerland | 285/276 |

OTHER PUBLICATIONS

Imperial Eastman Catalog, p. 12.
Aevoquip Bulletin 5375, cover page.
Hydraulics Inc., S Series, 1 p.

Primary Examiner—Thomas F. Callaghan
Attorney, Agent, or Firm—Wendell E. Miller

[57] ABSTRACT

The present invention relates to swivel fluid fitting and swivel hose ends. In prior art designs, it has been a problem to provide simple, compact, and economical swivel fluid fittings in which the ball thrust bearings are both lubricated and protected from the environment by being located on the fluid side of the rotary seal. The present invention solves the problem by partially assembling the swivel fluid fitting prior to projection welding of the two-piece outer member and by magnetically retaining the steel balls during assembly. Principal uses for the invention include providing swiveling joints in either rigid or flexible conduits for conducting of air, gasses, and liquids.

1 Claim, 12 Drawing Figures

4,299,415

SWIVEL FITTING AND METHOD FOR MAKING

TECHNICAL FIELD

The present invention pertains to swivel fittings and more particularly to swivel fittings of the type that are used in conducting fluids and that include ball thrust bearings.

BACKGROUND ART

Swivel fluid fittings of the prior art are of two basic types: the pressure balanced type which requires two rotary seals, and the pressure unbalanced type which requires only one rotary seal but which requires a ball thrust bearing in order to minimize the torque that is required to rotate the fitting at high fluid pressures. The pressure unbalanced type has the advantage of compactness and freer fluid flow than the pressure balanced type.

The prior art in the pressure unbalanced type of swivel fluid fittings has included the assembly gland type in which the thrust bearing is longitudinally inserted and retained by an assembly gland. This type of swivel fluid fitting is inherently complex, bulky, and expensive.

The prior art in pressure unbalanced swivel fluid fittings has also included a design in which grooves for thrust bearing races are machined into mating surfaces of the inner and outer members and the thrust balls are inserted individually through a transversely disposed hole that is subsequently plugged. This type of swivel fluid fitting is less complex, less bulky, and less expensive than the assembly gland type.

The present invention retains all of the advantages of the last-mentioned type of swivel fluid fitting; and, in addition, both eliminates the transversely disposed hole and locates the rotary shaft seal outwardly of the thrust balls whereby the thrust balls are lubricated and protected from corrosion by the oil being conducted by the swivel fluid fitting.

DISCLOSURE OF INVENTION

In accordance with the broader aspects of this invention, there is provided a swivel fluid fitting having an outer member that includes a bore that extends inwardly and that includes a first fluid port that communicates with the bore, and having an inner member that is rotatably inserted into the bore and that includes a second fluid port communicating with the bore.

The outer member also includes a circumferential recess that is disposed radially outward from the bore; and this circumferential recess includes a circumferential shoulder that is disposed intermediate of the circumferential recess and an outer surface of the outer member.

The inner member includes a retaining ring groove that is longitudinally disposed within the circumferential recess of the outer member; and an expandable retaining ring is retainingly engaged in the retaining ring groove.

A thrust ring encircles the outer member and is disposed within the circumferential recess intermediate of the retaining ring and the circumferential shoulder; and a plurality of balls are circumferentially disposed intermediate of the thrust ring and the circumferential shoulder. Thus, the thrust ring, the plurality of balls, and the circumferential shoulder cooperate to provide a thrust bearing between the inner member and the outer member.

The outer member includes first and second outer member portions that are permanently bonded at a joint that intercepts the circumferential recess; and the method of the present invention includes inserting both the retaining ring and the thrust ring into the circumferential recess before the bonding step.

The method further comprises retaining the steel balls within the circumferential recess during the assembly steps by exerting a magnetic field in the general vicinity of the circumferential recess.

The advantages of the present invention include providing a swivel fluid fitting or swivel hose end of simple and compact design, providing a swivel fluid fitting or swivel hose end that is economical to manufacture, providing a swivel fluid fitting or a swivel hose end that freely swivels even when pressurized because of the inclusion of ball thrust bearings, providing a swivel fluid fitting or swivel hose end in which steel thrust bearings are on the fluid side of a rotating seal and are thereby both lubricated and protected from the environment by the fluid being conducted, providing an assembly procedure that includes partial assembly of internal parts and then projection welding of the outer member portions around the internal parts, achieving compact design and trouble-free operation because of the welded construction, and achieving ease of assembly of the steel balls by magnetically retaining the steel balls in place.

The above-mentioned and other advantages of the present invention and the manner of attaining them will become more apparent and the invention itself will be best understood by reference to the following description of an embodiment of the invention taken in conjunction with the accompanying drawings.

BEST MODE FOR CARRYING OUT THE INVENTION

Figure 1:
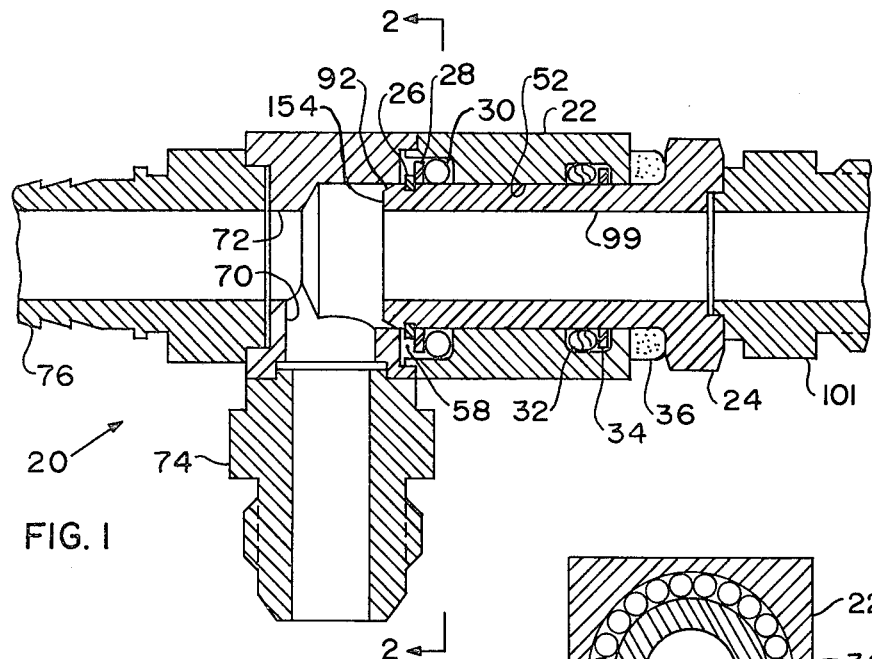
FIG. 1 is a cross-sectional view of the present invention, showing a composite embodiment that illustrates the present invention as both a swivel fluid fitting and a swivel hose end.
Figure 2:
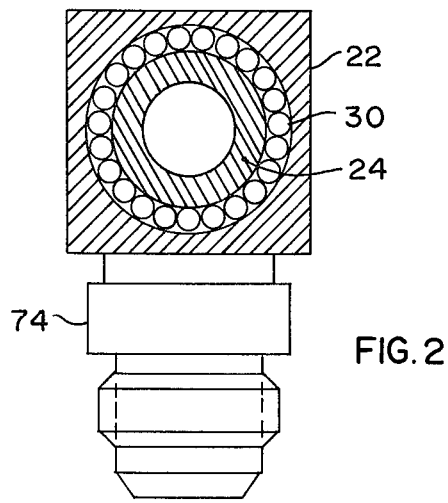
FIG. 2 is a cross-sectional view of the swivel fluid fitting of FIG. 1, taken substantially as shown by section line 2—2 of FIG. 1.

Referring now to the drawings, and more particularly to FIGS. 1 and 2, a swivel fluid fitting or swivel fitting 20 includes a two-piece outer member 22, an inner member 24, an expandable retaining ring 26, a thrust ring 28, a plurality of steel balls 30, an O-ring 32, a backup washer 34, and a dust seal 36.

Figure 3:
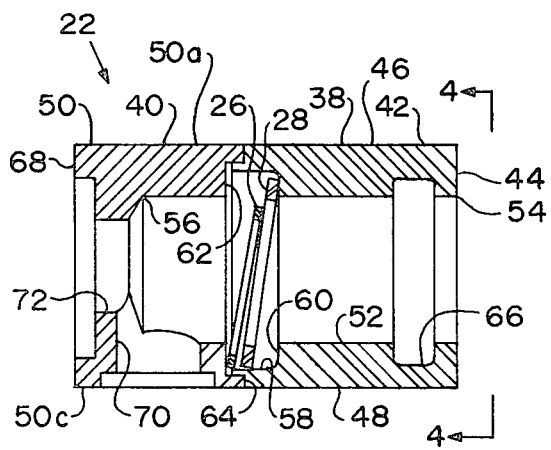
FIG. 3 is a cross-sectional view of the outer member of the swivel fluid fitting of FIG. 1, taken as shown in FIG. 1 and as shown by section line 3—3 of FIG. 4.
Figure 4:
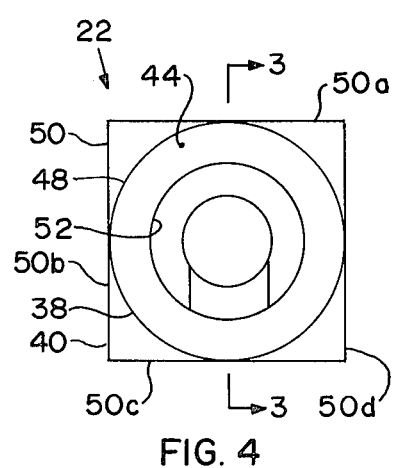
FIG. 4 is an end view of the outer member of FIG. 3, taken as shown by view line 4—4 of FIG. 3.

Referring now to FIGS. 3 and 4, the two-piece outer member 22 includes a first piece or first outer member portion 38 and a second piece or second outer member portion 40 that jointly include an outer surface 42. The outer surface 42 includes an end surface 44 and a side surface 46. The side surface 46 includes a first side surface portion 48 that is circumferentially disposed on the first outer member portion 38 and a second side surface portion 50 that is disposed on the second outer member portion 40.

A bore 52 intercepts the end surface 44 and extends inwardly of the outer member 22. The bore 52 includes a first end 54 that is proximal to the end surface 44 and a second end 56 that is inwardly distal of the end surface 44.

A circumferential recess or circumferentially enlarged portion 58 serves as a circumferential ball-receiving recess and extends radially outward from the bore 52 intermediate of the ends 54 and 56 thereof. The circumferential recess 58 includes a circumferential shoulder 60 that is disposed proximal to the first end 54 of the bore 52; and the circumferential recess 58 includes a second circumferential shoulder 62 that is disposed distal from the first end 54. The circumferential shoulder 60 is an integral part of the first outer member portion 38; and the second circumferential shoulder 62 is an integral part of the second outer member portion 40. The outer member portions 38 and 40 are joined at a bonded joint between end surfaces 64 and 82. The bonded joint between the end surfaces 64 and 82 preferably comprises a welded joint and more preferably comprises a projection welded joint.

The outer member 22 includes an O-ring groove or sealing gland groove 66 that is disposed intermediate of the end surface 44 and the circumferential recess 58. The outer member 22 also includes a second end surface 68; and, since the second outer member portion 40 is fabricated from square stock, the second side surface portion 50 includes side surface portions 50a, 50b, 50c, and 50d.

The outer member 22 is provided with at least one port 70 which is illustrated as communicating with the bore 52. The outer member 22 also includes a port 72 which communicates with the bore 52 from the end surface 68. It will be apparent that there are five surface portions, 50a, 50b, 50c, 50d, and 68 that may be optionally equipped with ports, such as the ports 70 and 72, and that these optional ports would also communicate with the bore 52.

Referring now to FIGS. 1-4, a flare-type hose or tube fitting 74 is shown projection welded to the surface portion 50c and in fluid communication with the port 70; and a barbed hose fitting 76 is shown projection welded to the surface 68 and in fluid communication with the port 72.

Figures 5A, 5B:
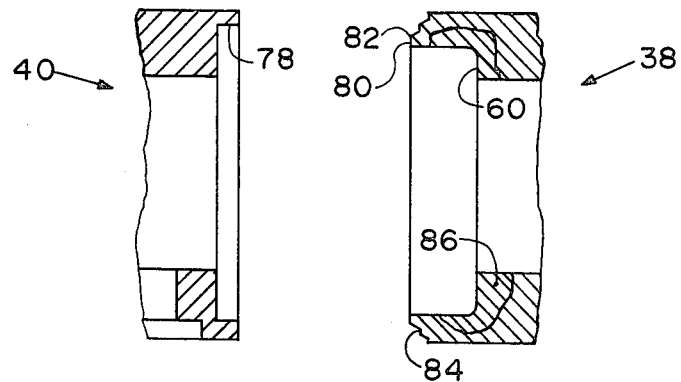
FIG. 5A is an enlarged cross-sectional view of one portion of the outer member of FIG. 3.
FIG. 5B is an enlarged cross-sectional view of another portion of the outer member of FIG. 3.

Referring now to FIGS. 5A and 5B, the second outer member portion 40 includes a pilot bore 78; and the first outer member portion 38 includes an aligning pilot 80 having a maximum outside diameter that is substantially equal to the pilot bore 78. The aligning pilot 80 preferably tapers to a smaller diameter at the end surface 82 to facilitate in inserting the aligning pilot 80 into the pilot bore 78. The first outer member portion 38 also includes a welding projection 84.

Referring now to FIG. 5B, the material for the first outer member portion 38, which is preferably steel, includes a first hardness; and, preferably the first outer member portion 38 is hardened to a second or higher hardness in the general vicinity of the circumferential shoulder 60 as shown by a hardened area 86. The purpose of the hardened area 86 is to provide surface compressive fatigue resistance for the steel balls 30 of FIG. 1.

Figures 6, 7:
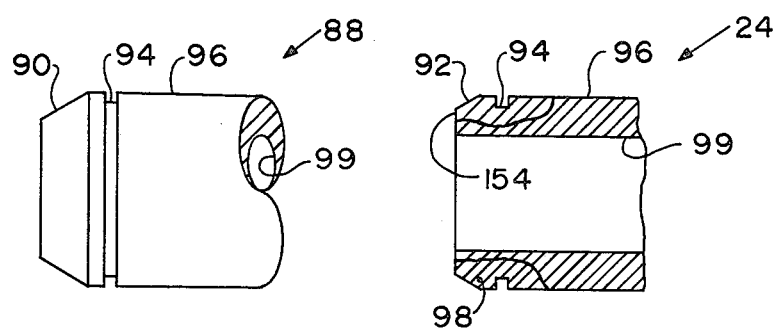
FIG. 6 is a partial and enlarged view showing an alternate design for the inner member of the embodiment of FIG. 1.
FIG. 7 is a partial and enlarged cross-sectional view of the inner member of the embodiment of FIG. 1, showing a hardness pattern thereof.

Referring now to FIGS. 1, 6, and 7, a portion of an alternate inner member 88 is shown in FIG. 6; and the alternate inner member 88 includes a long chamfer 90 which will function to center the expandable retaining ring 26 of FIG. 1 during assembly. However, in the preferred embodiment, the inner member 24 includes a short chamfer 92 because the long chamfer 90 of the inner member 88 would extend longitudinally into the port 70 and thereby interfere with free fluid flow therethrough.

The inner members 24 and 88 include a retaining ring groove 94 which is circumferentially disposed in a cylindrically shaped outer surface 96. Preferably, at least a portion of the inner members 24 and 88 are hardened in the proximity of the retaining ring groove 94 as shown by hardened area 98 of FIG. 7; and more preferably, the inner members 24 and 88 are case-hardened by carburizing to provide hardness not only in the general vicinity of the retaining ring groove 94 but also in the portion of the outer surface 96 that contacts the O-ring 32.

The inner members 24 and 88 include a longitudinal passage or port 99; and any suitable fluid fitting, such as a fluid fitting 101 of FIG. 1, may be welded to the inner member 24 to provide fluid communication to the bore 52 and to the fluid ports 70 and 72.

Figures 8, 9:
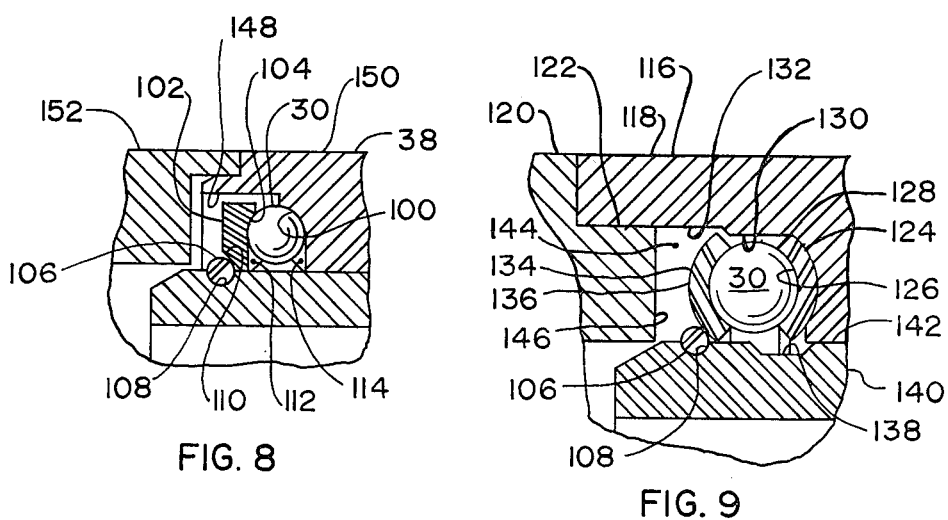
FIG. 8 is a partial and enlarged cross-sectional view, showing a modification of the preferred embodiment of FIG. 1.
FIG. 9 is a partial and enlarged cross-sectional view showing another modification of the preferred embodiment of FIG. 1.

Referring now to FIG. 8, in an alternate construction, the shoulder 60 of FIG. 3 is replaced by a curved surface shoulder 100 in FIG. 8 for the purpose of reducing the surface compressive stress on the steel balls 30. In addition, the thrust ring 28 of FIG. 1 is replaced by a thrust ring 102 in the FIG. 8 embodiment; and the thrust ring 102 includes a curved surface 104 to reduce the surface compressive stress between the thrust ring 102 and the steel balls 30.

The alternate construction in FIG. 8 also includes the use of a circular cross-section retaining ring 106, a circular retaining ring groove 108, and a chamfer 110 on the thrust ring 102. The chamfer 110 serves to force the retaining ring 106 downward into the retaining ring groove 108 and so provides superior retaining power over the design of FIG. 1.

The thrust ring 102 includes a filling notch 112; and the first outer member portion 38 includes a filling notch 114. The filling notches 112 and 114 cooperate to provide a means for installation of the steel balls 30.

Referring now to FIG. 9, in another alternate embodiment, a two-piece outer member 116 includes first and second outer member portions 118 and 120 which are preferably made of a suitable plastic material, and which are preferably adhesively bonded in a bonded joint 122.

The alternate embodiment of FIG. 9 includes a thrust ring 124 which is preferably stamped from sheet steel to provide a curved surface 126 for reducing surface compressive fatigue between the thrust ring 124 and the steel balls 30, which preferably includes an outside diameter 128 which retainingly engages a reduced portion 130 of a circumferential recess 132 of the outer member portion 118.

In the alternate embodiment of FIG. 9, the thrust ring 28 of the FIG. 1 embodiment has been replaced by a curved thrust ring 134; and the circular cross-section retaining ring 106 contacts an outer surface 136 of the thrust ring 134 in a manner in which the thrust ring 134 presses the retaining ring 106 downwardly into the retaining ring groove 108 at approximately 45 degrees.

A circumferential groove 138 in an inner member 140 provides radial clearance between the thrust ring 124 and the inner member 140, thereby allowing the thrust ring 124 to be identical with the thrust ring 134 which must be sized to fit snugly against an outer surface 142 of the inner member 140.

In order to allow assembly of the steel balls 30 between the thrust rings 124 and 134, a longitudinal space 144 is provided between the thrust ring 134 and a shoulder 146 of the outer member portion 120.

Referring now to FIGS. 3, 5A, 5B, 8, and 9, the preferred method of assembly includes inserting the retaining ring 26 and the thrust ring 28 into the circumferential recess 58 of the first outer member portion 38 of FIG. 5B, inserting the retaining ring 106 and the thrust ring 102 into a circumferential recess 148 of the first outer member portion 150 of the FIG. 8 embodiment, or inserting the thrust ring 124, the thrust ring 134, and the retaining ring 106 into the circumferential recess 132 of the outer member portion 120 of FIG. 9 as the first step. A second step of the method includes bonding first and second outer member portions 38 and 40 of FIG. 3, bonding outer member portions 150 and 152 of FIG. 8, or bonding first and second outer member portions 118 and 120 of FIG. 9.

Figure 10:
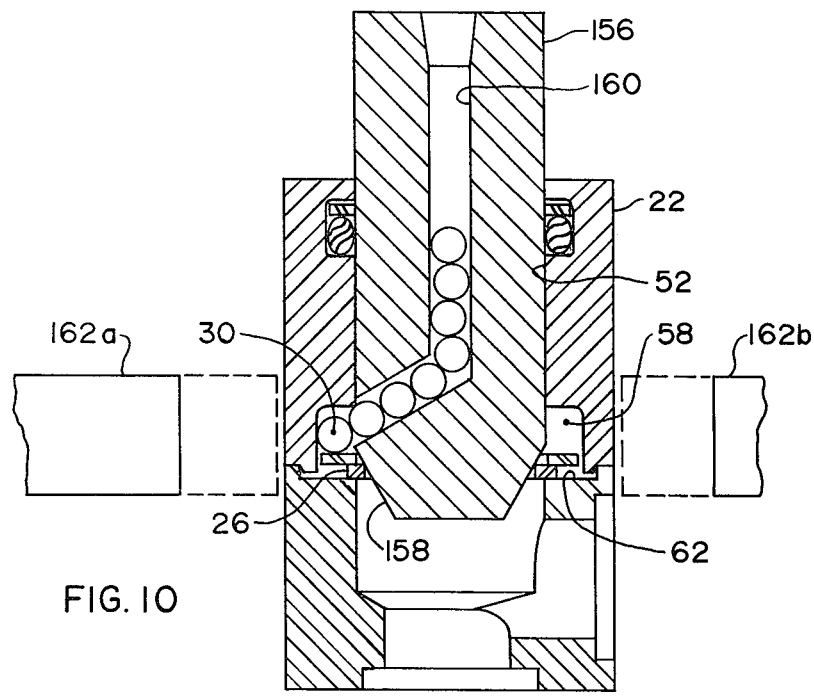
FIG. 10 is an enlarged cross-sectional view of the outer member of the embodiment of FIG. 1, showing the preferred method of assembly.

Referring now to FIGS. 1, 3, and 10, and more particularly to FIG. 10, additional steps in the method are common for FIGS. 1, 8, and 9, so that a discussion of the steps of assembling the FIG. 1 embodiment will suffice for the alternate embodiments of FIGS. 8 and 9 also. Additional steps of the method include moving the retaining ring 26 into contact with the shoulder 62, centering the retaining ring 26, inserting the balls 30 into the circumferential recess 58, and inserting an inner end 154 of the inner member 24 into the bore 52 as shown in FIG. 1, expanding the retaining ring 26 by forcing the chamfer 92 inside the retaining ring 26, and pressing the inner member 24 into a position wherein the retaining ring 26 engages the retaining ring groove 94.

The aforementioned steps of the method are preferably achieved by the use of an assembly tool or ball guide 156 which includes a chamfer 158. The steps of the method which include the use of assembly tool 156 include: centering the retaining ring 26 by inserting the assembly tool 156 into the bore 52, filling the circumferential recess 58 with steel balls 30 by dropping the steel balls 30 through a passage 160 in the assembly tool 156, exerting a magnetic force in the general vicinity of the circumferential recess 58 by moving magnets 162a and 162b into proximal relationship with and preferably into contact with the outer member 22, removing the assembly tool 156, and inserting the inner member 24 into the bore 52.

Figure 11:
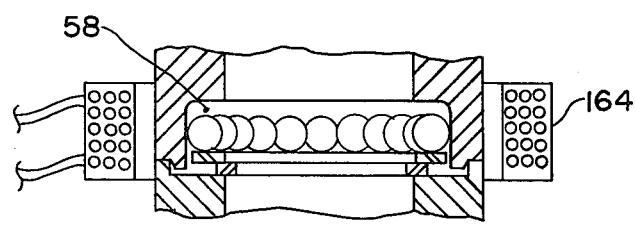
FIG. 11 is a partial and enlarged cross-sectional view of the outer member of FIG. 10, showing an alternate method of exerting a magnetic force to retain the steel balls in the outer member during assembly.

Referring now to FIG. 11, alternately, a magnetic field is exerted into the vicinity of the circumferential recess 58 by use of an electromagnetic coil 164.

Alternately, grease, or other material having a high viccosity, may be injected into the circumferential recess 58, via the passage 160, along with the steel balls 30, as a means for retaining the steel balls 30 in the circumferential recess 58 during assembly.

In summary, the retaining ring 26 of FIG. 1 provides a retaining means, the thrust ring 28 provides a means for retainingly cooperating with the inner member 24, the bonded joint, between the end surfaces 64 and 82, provides means for assembling access and for bonding after inserting the retaining ring 26 and the thrust rings 28, the steel balls 30 provide thrust bearing means for minimizing the torque that is required to rotate the inner member 24, the O-ring 32 provides a rotating seal means for effecting a fluid seal between the inner member 24 and the outer member 22, either the hardened area 86 of FIG. 5B or the thrust ring 124 of FIG. 9 is a means for providing a second and higher hardness, and the chamfer 92 of FIG. 1 provides a means for expanding the retaining ring 26.

While there have been described above the principles of the present invention in connection with specific apparatus, and while numbers have been inserted into the appended claims in parentheses in connection with the elements recited therein, it is to be clearly understood that both the description and the parenthetically included numbers are made only by way of example; and the scope of the invention is to be defined by the appended claims without limitation by the parenthetical numbers inserted therein.

INDUSTRIAL APPLICABILITY

The present invention is industrially applicable to both flexible and rigid conduits for fluid transmission of air, gasses, water, oil, and other fluids and is effective to provide fluid-tight joints that swivel at low torques, even when the fluid in the conduits is highly pressurized.

What is claimed is:

1. A swivel fluid fitting which comprises a two-piece outer member having a first outer member portion that includes first and second spaced-apart and substantially parallel surfaces, having a second outer member portion that includes a third surface juxtaposed against said second surface and that includes a fourth surface, having a bonded joint that joins said second and third surfaces, having a bore with a first end that orthogonally intercepts said first surface and with a second end that is disposed on said second outer member portion, having a circumferential recess in said bore that is interposed intermediate of said ends of said bore and that opens into one of said juxtaposed surfaces, and having a sealing gland groove in said bore that is disposed intermediate of said first end of said bore and said circumferential recess;

a thrust ring being disposed in said circumferential recess and being permanently retained in said outer member by said bonded joint;

an expandable retaining ring being disposed in said circumferential recess intermediate of said thrust ring and said second end of said bore and being permanently retained in said outer member by said bonded joint;

an inner member having a cylindrically-shaped outer surface, being rotatably inserted into said first bore and through said thrust ring, having an inner end that extends into said second outer member portion, having a retaining ring groove in said cylindrically-shaped outer surface that retainingly engages said expandable retaining ring, and having a second port that extends longitudinally through said inner member and that communicates with said first port;

a plurality of steel balls being circumferentially disposed around said cylindrically-shaped outer surface and inside said circumferential recess intermediate of said thrust ring and said first end of said bore; and a sealing ring being inserted into said sealing gland groove.

* * * * *